United States Patent [19]
Iwata et al.

[11] Patent Number: 5,210,738
[45] Date of Patent: May 11, 1993

[54] OPTICAL INFORMATION RECORDING MEDIUM

[75] Inventors: Hiroki Iwata; Yutaka Murakami, both of Yamanashi, Japan

[73] Assignees: Pioneer Electronic Corporation, Tokyo; Pioneer Video Corporation, Yamanashi, both of Japan

[21] Appl. No.: 683,914

[22] Filed: Apr. 11, 1991

[30] Foreign Application Priority Data

Jun. 15, 1990 [JP] Japan ................... 2-155126

[51] Int. Cl.$^5$ ............................... B32B 9/00
[52] U.S. Cl. ..................... 369/275.1; 369/275.3; 369/276; 369/277; 369/278; 369/279; 430/945; 346/76 L; 346/135.1; 428/64; 428/65; 428/913
[58] Field of Search ............... 428/64, 65, 913; 346/76 L, 135.1; 430/945; 369/275.1, 275.3, 276, 277, 278, 279

[56] References Cited

U.S. PATENT DOCUMENTS

| | | | |
|---|---|---|---|
| 4,535,439 | 8/1985 | Satoh et al. | 369/275 |
| 4,587,648 | 5/1986 | Ando | 369/275 |

Primary Examiner—Patrick J. Ryan
Assistant Examiner—Cathy Lee
Attorney, Agent, or Firm—Sughrue, Mion, Zinn, Macpeak & Seas

[57] ABSTRACT

An optical information recording medium, such as an optical disk, includes a meandering guide groove being varied in period according to first additional information and in amplitude according to second additional information. The optical information recording medium enables recording a plurality of kinds of information in addition to the first and second additional information in accordance with a multiple recording system.

3 Claims, 2 Drawing Sheets

OPTICAL INFORMATION RECORDING MEDIUM

BACKGROUND OF THE INVENTION

1. Field of the Invention

The present invention relates to a writable or rewritable optical information recording medium.

2. Description of the Prior Art

A writable or rewritable optical information recording medium such as an optical disk is normally provided with a groove for tracking, and depressions for storing address data and clock information, namely, in the form of pits, formed at the bottom of the groove. An area for the pits to store address data and the like are not usable as an area for recording information.

It is desirable to store as much address data as possible. However, the more the area devoted to the address data is increased, the more the area for the information is decreased. This results in reducing the capacity of the optical disk.

Recently, there has been proposed a writable optical disk D provided with a guide groove having a meandering mid-line of $G_1$ and a constant amplitude A, as shown in FIG. 1A. The perspective view of the guide groove is shown in FIG. 1B, wherein both width W and depth t of the guide groove are kept substantially constant. The meandering of the guide groove is caused by a carrier wave which is frequency-modulated by an address data signal. Furthermore, the surface of the optical disk D where the guide groove is formed is coated with a recording layer such as of a dyestuff and the like (not shown) for providing writable or rewritable capability.

A process for fabricating an optical video disk or a compact disk can be applied to the manufacture of the writable optical disk D having such a guide groove without any modification.

In fabricating the optical disk D provided with such a guide groove, a major surface of a glass substrate is first covered with a photoresist film having a predetermined thickness by a spin coating process. The photoresist film is then exposed to a light beam such as an Argon laser beam, which is oscillated in accordance with a carrier wave, which is frequency-modulated by an address data, through an optical light beam deflector. Then the exposed photoresist film on the glass substrate is developed to obtain a master disk. A stamper is then prepared to make use of the master disk, and, in turn, a synthetic resin disk substrate produced by employing the stamper is covered with a recording layer and a protective layer for fabricating the optical disk D provided with the guide groove.

In the conventional writable optical disk D, additional data that can be multiplexed onto the guide groove are limited to two kinds of data, the address data and timing data. However, when the frequency of the carrier wave is utilized as the timing data, it is desired to record various kinds of information besides these data through a multiplex recording system in order to increase packing density.

It is therefore an object of the present invention to provide an optical recording medium having an increased packing density by recording various kinds of information onto a guide groove through the multiplex recording system.

SUMMARY OF THE INVENTION

According to the aspect of the present invention, there is provided an optical information recording medium wherein a guide groove is meandered in a direction perpendicular to a direction of tracking with a predetermined period (frequency) and amplitude, whereby the period of meandering of the guide groove is varied in accordance with first additional information while the amplitude of meandering of the guide groove is varied in accordance with second additional information.

In the optical information recording medium embodying the present invention, since the period of meandering of the guide groove is varied in accordance with the first additional information while the amplitude of meandering of the guide groove is varied in accordance with the second additional information, the various kinds of recorded information are detected only by detecting the undulation and amplitude of the meandering guide groove.

DESCRIPTION OF THE PREFERRED EMBODIMENT

The above and other objects, features and advantages of the present invention will become more apparent from the following description taken in connection with the accompanying drawings.

Figure 1A:
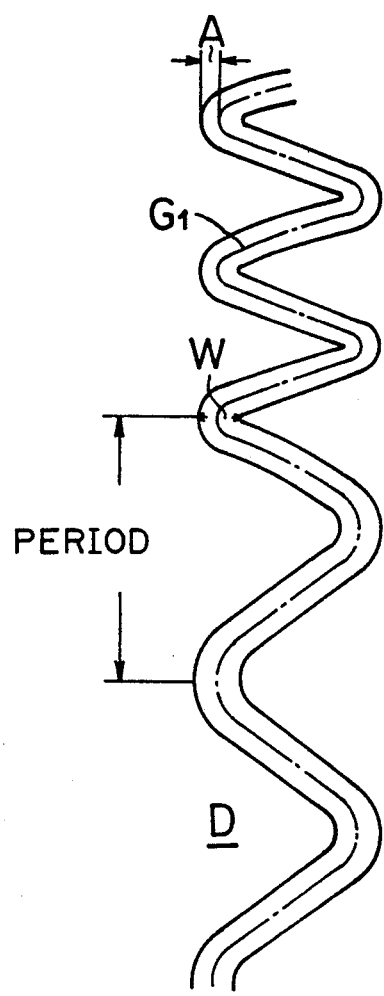
FIG. 1A is a diagram showing a portion of a guide groove, together with a mid-line, formed on a conventional optical information recording medium.
Figure 2:
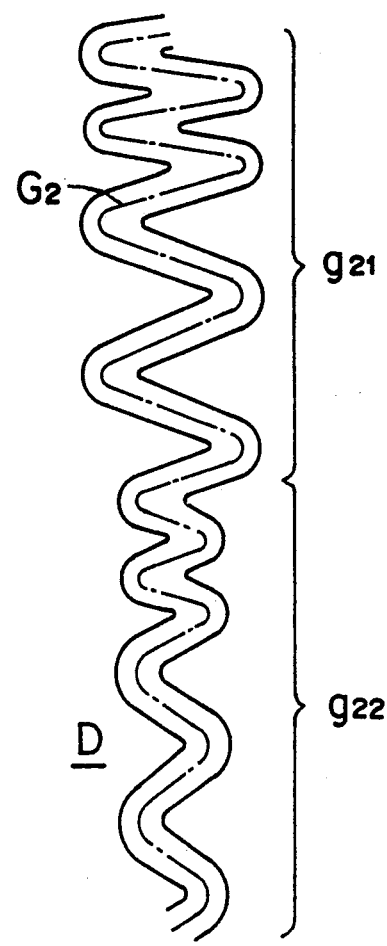
FIG. 2 is a diagram showing a portion of a guide groove, together with a mid-line, formed on an optical information recording medium embodying the present invention.
Figure 1B:
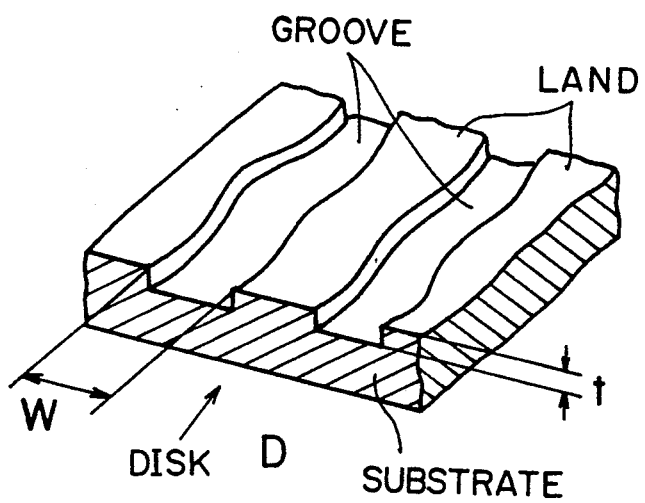
FIG. 1B is a perspective view showing a portion of the guide groove formed on an optical information recording medium.

Referring now to FIG. 2, an optical information recording medium, such as an optical disk, embodying the present invention is provided with the guide groove the mid-line $G_2$ of which is meandered in accordance with a carrier wave which is frequency-modulated by first additional information while the amplitude is varied in accordance with second additional information. The frequency of the carrier wave is selected so that it does not cause interference with either a servo signal or data.

The guide groove itself has a substantially constant width and depth. Preferably, the amplitude of meandering of the guide groove is kept within a range of 3–15% of a track pitch (a groove pitch) thus for preventing the guide groove from abutting upon an adjacent guide groove. In accordance with this preferred embodiment, an amplitude of a first portion $g_{21}$ of the guide groove is greater than a second portion $g_{22}$ thereof.

Furthermore, the optical information recording medium is covered with a recording layer such as dyestuff and the like (not shown) on a surface, where the guide groove is formed, for providing a writable or rewritable optical disk. The optical information is recorded on the recording layer formed on the guide groove or may be on a land between the adjoining guide grooves on the optical disk by making use of a write beam modulated by the main optical information. As for the information, for example, the carrier wave is utilized as a clock signal, the first additional information is a digital address signal, and the second additional information is a digital standard information signal other than the above two.

Figure 3:
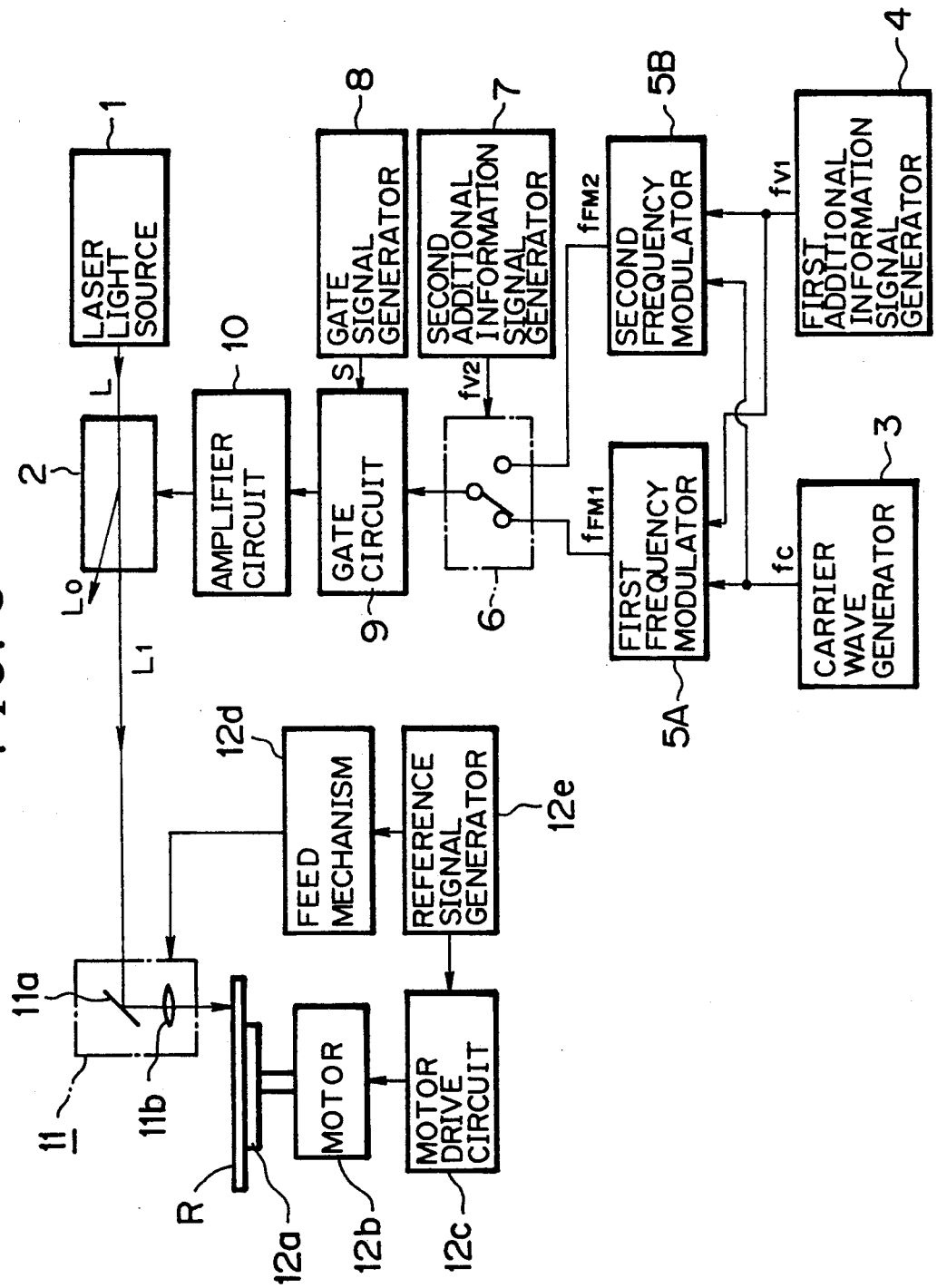
FIG. 3 is a block diagram of an optical information recording apparatus for forming a guide groove on the optical information recording medium having the mid-line of the guide groove shown in FIG. 2.

An optical information recording apparatus for fabricating a master disk of the optical information recording medium will be described hereinafter with reference to FIG. 3.

A laser beam L emitted by a laser light source 1, such as an Argon laser, is guided to an optical light beam deflector 2, such as an ultrasonic acousto-optic deflector, for deriving a first order diffracted light beam $L_1$ oscillating with a very small amplitude according to the first and second additional information therefrom.

A first frequency modulator 5A and a second frequency modulator 5B receive a carrier wave $f_c$ from a carrier wave generator 3 and a first additional information signal $f_{v1}$ from a first additional signal generator 4, and in turn provide a first frequency modulated signal $f_{FM1}$ attained by frequency-modulating the carrier wave $f_c$ with the first additional information signal $f_{v1}$, or a second frequency modulated signal $f_{FM2}$ attained by frequency-modulating the carrier wave $f_c$ with the first additional information $f_{v1}$, whereby the frequency deviation $\Delta f$ of the first frequency modulated signal $f_{FM1}$ and the frequency deviation $\Delta f$ of the second frequency modulated signal $f_{FM2}$ are selected to be different from each other.

A switching circuit 6 selects either the first frequency modulated signal $f_{FM1}$ or the second frequency modulated signal $f_{FM2}$ according to a second additional signal $F_{v2}$ generated by a second additional information signal generator 7. Hence the first frequency modulated signal $f_{FM1}$ or the second frequency modulated signal $f_{FM2}$ being selected based on the second additional information signal $f_{v2}$ is fed to the optical light beam deflector 2 through a gate circuit 9 and an amplifier 10 under the control of the gate circuit 9 at the time when an ON signal is fed from a gate signal generator 8. Then, the optical light beam deflector 2 deflects the laser beam L according to the first frequency modulated signal $f_{FM1}$ or the second frequency modulated signal $f_{FM2}$ for oscillating the laser beam L with a very small amplitude in a direction perpendicular to the direction to from a guide groove, and there is generated a first order diffracted light beam $L_1$ varying in its amplitude by a very small amount. There is also generated a zeroth order diffracted light beam $L_0$ generated together with the first order diffracted light beam $L_1$, however, this is not used in this preferred embodiment. The first order diffracted light beam $L_1$ generated by the optical light beam deflector 2 concentrated onto a recording surface of a blank disk R, which is prepared by coating a surface of a glass disk with a photoresist film, by means of a recording optical system 11 consisting of a mirror 11a and an objective lens 11b.

The blank disk R is mounted on a turntable 12a which is driven to produce rotation by a motor 12b. A motor driving circuit 12c generates a driving signal upon receiving a reference signal from a reference signal generator 12e and supplies the driving signal to the motor 12b, so that the blank disk R mounted on the turntable 12a is rotated.

A feed mechanism 12d feeds the recording optical system 11 in a direction radial to the rotating axis of the blank disk R in response to the reference signal generated by the reference signal generator 12e.

Thus, the recording surface of the blank disk R is exposed to the concentrated first order diffracted light beam $L_1$ oscillating in accordance with the different additional information signals, which are being varied in period and amplitude, for forming a guide groove having the meandering mid-line $G_2$ as shown in FIG. 2.

Although the present invention has been described in detail with reference to the presently-preferred embodiment, it should be understood by those of ordinary skilled in the art that various modification can be made without departing from the scope and spirit of the invention. Accordingly, the invention is not to be limited except as by the appended claims.

What is claimed is:

1. An optical information recording medium having a meandering guide groove on its recording surface for writing information optically in the guide groove or between the adjoining guide grooves, being characterized in that:
   a period of meandering of the guide groove is varied by first additional information which comprises a digital address signal, and an amplitude of meandering of the guide groove is varied by second additional information and is kept within a range of 3–15% of the track pitch.

2. An optical information recording medium as claimed in claim 1, wherein a width and a depth of the guide groove are maintained substantially constant.

3. An optical information recording medium as claimed in claim 1, wherein the guide groove is meandered periodically in a radial direction of the recording medium, whereby a frequency of meandering of the guide groove is frequency-modulated by the first additional information.

* * * * *